UNITED STATES PATENT OFFICE.

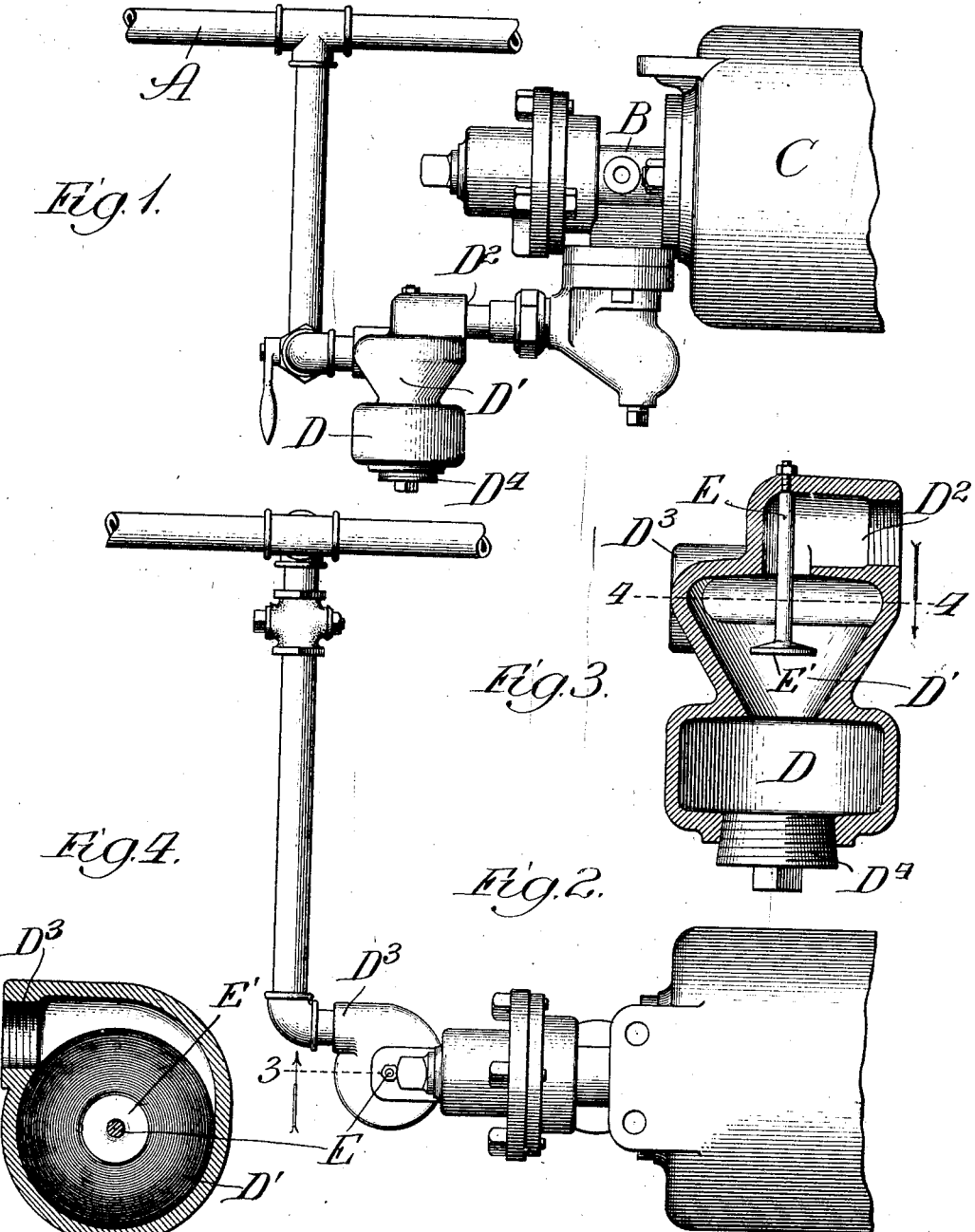

WILLIAM A. DERBY, OF AURORA, ILLINOIS.

DUST-COLLECTOR.

No. 878,126.

Specification of Letters Patent.

Patented Feb. 4, 1908.

Application filed February 12, 1907. Serial No. 356,970.

*To all whom it may concern:*

Be it known that I, WILLIAM A. DERBY, a citizen of the United States, residing at Aurora, in the county of Kane and State of Illinois, have invented a new and useful Dust-Collector, of which the following is a specification.

My invention relates to certain new and useful improvements in dust collectors, which are fully described and explained in the specification and shown in the accompanying drawings, in which Figure 1 is a side elevation of my improved dust collector, showing the same in connection with certain parts of an air-brake system; Fig. 2 is a top plan of the parts shown in Fig. 1; Fig. 3 is a vertical section through the dust collector proper; and Fig. 4 is a horizontal section in the line 4—4 of Fig. 3.

Referring to the drawings, it will be seen that my dust collector is illustrated in connection with certain parts of an air-brake system. The structure is especially adapted for such use and its forms and proportions are especially designed therefor. However, it will be evident that it can be used in other connections, as, for instance, in the signaling system of a railroad train or in any other kind of an air-pressure system in which it is desired to remove the dirt and dust from the elastic fluid before passing it through parts which might be injured thereby, or before discharging it into a space where the dust and dirt would produce any undesirable results.

In the drawings, A, indicates the train pipe; B, the triple valve, and C, the auxiliary reservoir of an air-brake system, these parts all being of standard form and capable of modification to almost any extent without in any way affecting my invention. I have therefore not illustrated the detailed construction of these parts, nor shall I describe them in detail. Between the train pipe and the triple valve I interpose my dust collector, the frame of which is cast in one piece and comprises three distinguishable portions, a lower cylindrical dust-receiving chamber, D, an inverted conical separating chamber, $D^1$, and an outlet port, $D^2$. The separating chamber, $D^1$, is provided at one side with a tangentially-entering integral intake port, $D^3$, threaded to receive connections from the train pipe, the said port entering the inverted conical chamber at the upper portion thereof, so that the air entering the chamber from the train pipe sets up a more or less rapid gyratory action within the separating chamber, with the result that the dust and other comparatively heavy particles therein contained, pass through the separating chamber towards its apex and eventually pass out of the whirl of air and fall into the dust-receiving chamber, D. This chamber is materially larger in cross-section than the area of the contracted opening which connects it with the separating chamber $D^1$, whereby the imperforate portion of the upper wall of the same forms an outwardly projecting ledge around such opening, and which covers and protects the greater portion of such dust-receiving chamber, and thereby prevents the dust collected therein from being drawn upwardly through said opening by the whirling current of air in the separating chamber. The upper wall of the inverted conical separating chamber is centrally perforated for the exit of the air, and the exhaust port, $D^2$, which is inclosed by a suitable wall threaded for connection with the triple valve, incloses this central perforation so that the air passing from the separating chamber will issue from the port to the triple valve.

The lower portion of the dust-receiving chamber, D, is tightly closed by a removable plug, $D^4$, which, when removed, permits access to the dust-receiving chamber for the purpose of removing any accumulation of dust and dirt there present.

To the upper portion of the wall of the exhaust port, $D^2$, I secure a downwardly-depending rod, E, which extends through the perforation in the upper wall of the separating chamber and extends downward, terminating in a flat, preferably cylindrical, head, $E^1$, immediately above the opening from the conical separating chamber into the dust-receiving chamber.

In the use of the air-brake system, violent air currents are often set up in the dust collector and these currents are frequently of such force as to set the air in the dust-receiving chamber, D, into violent movement, with the result that if no means are provided to prevent such an occurrence, the dust already deposited will be gathered up by the air in its violent movement and carried on into the triple valve with very bad results. When such currents are set up in my improved device, however, the dust rising from the dust-receiving chamber, D, will strike the head, E¹, and its motion will be arrested thereby, so as to prevent such action. The method of supporting this head is particularly advantageous in that the head is entirely out of contact or connection with the side walls of the separating chamber, and as a result there are no projections upon said side walls tending to arrest the passage of the dust downward toward the dust-receiving chamber. Furthermore, any moisture which may be condensed by the release of pressure in the system or by the entrance of the air into the dust collector in cold weather, will pass freely downward into the dust-receiving chamber, so that no undesirable accumulations can occur in the separating chamber, which is comparatively inaccessible for cleaning purposes and from which any accumulations are likely to be carried into the triple valve.

I realize that considerable variation is possible in the details of construction without departing from the spirit of my invention, and I do not therefore intend to limit myself to the specific form herein shown and described.

I claim as new and desire to secure by Letters Patent:—

1. In a dust collector, a casing provided with an upper separating chamber and a lower collecting chamber said lower collecting chamber having its upper wall provided with an outwardly projecting ledge surrounding such opening, with a contracted free opening between them, the separating chamber being provided with a central opening in its upper wall, a wall above the upper wall of the separating chamber and inclosing said perforation, said wall being formed to inclose an exhaust port, an air inlet port extending tangentially from the upper part of the separating chamber, a stem extending through the upper opening in the collecting chamber and supported by the wall of the port, and a guard-head attached at its center the lower end of said stem in line with the opening between the separating and collecting chambers.

2. In a dust collector, a casing provided with an upper separating chamber and a lower collecting chamber said lower collecting chamber having its upper wall provided with an outwardly projecting ledge surrounding such opening, with a contracted free opening between them, the separating chamber being provided with a central opening in its upper wall, a wall above the upper wall of the separating chamber and inclosing said perforation, said wall being formed to inclose an exhaust port, an air inlet port extending tangentially from the upper part of the separating chamber, a stem extending through the upper opening in the collecting chamber and supported by the wall of the port, and a guard-head attached at its center the lower end of said stem in line with the opening between the separating and collecting chambers and above the level of said opening.

WILLIAM A. DERBY.

In presence of—
J. H. LANDES,
R. A. SCHAEFER.